Nov. 20, 1956  H. G. BRAENDEL  2,771,329
COMPOSITE PISTON RING
Filed Jan. 24, 1951  3 Sheets-Sheet 1
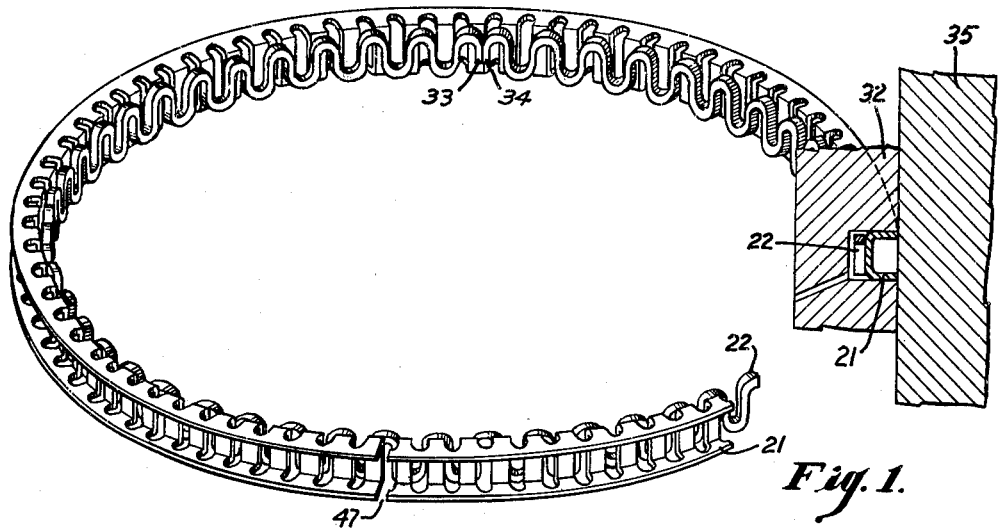
Fig. 1.
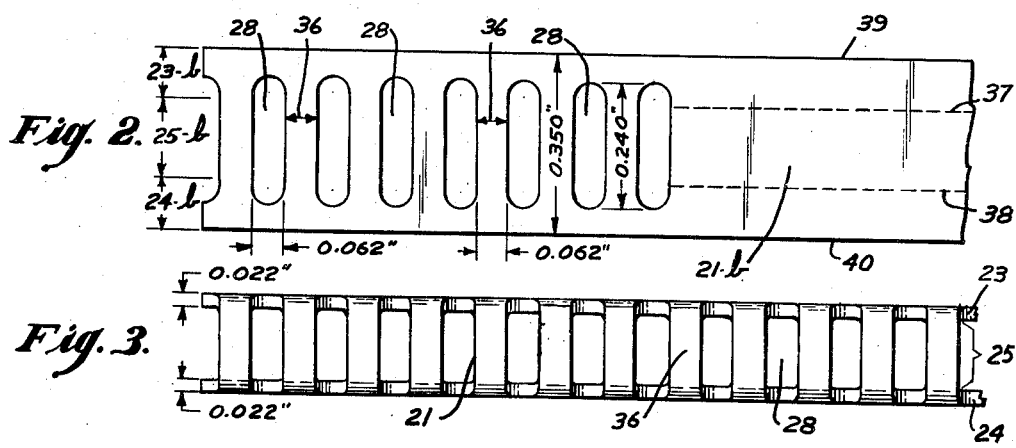
Fig. 2.
Fig. 3.
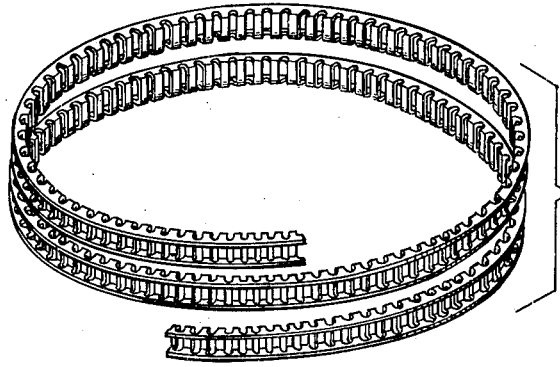
Fig. 4.
INVENTOR.
HELMUTH G. BRAENDEL
BY
Leonard L. Kalish
ATTORNEY INVENTOR.
HELMUTH G. BRAENDEL
BY
Leonard L. Kalish
ATTORNEY.

Nov. 20, 1956 H. G. BRAENDEL 2,771,329
COMPOSITE PISTON RING
Filed Jan. 24, 1951 3 Sheets-Sheet 3
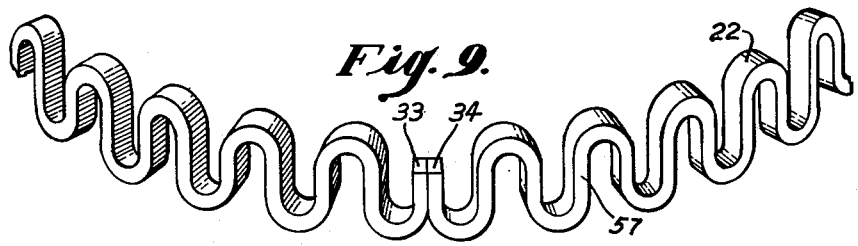
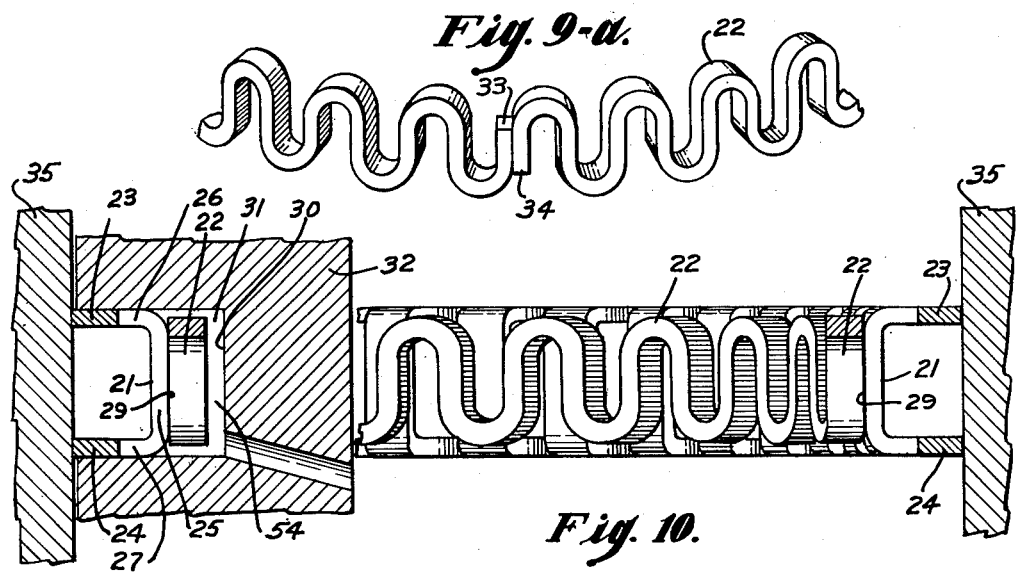
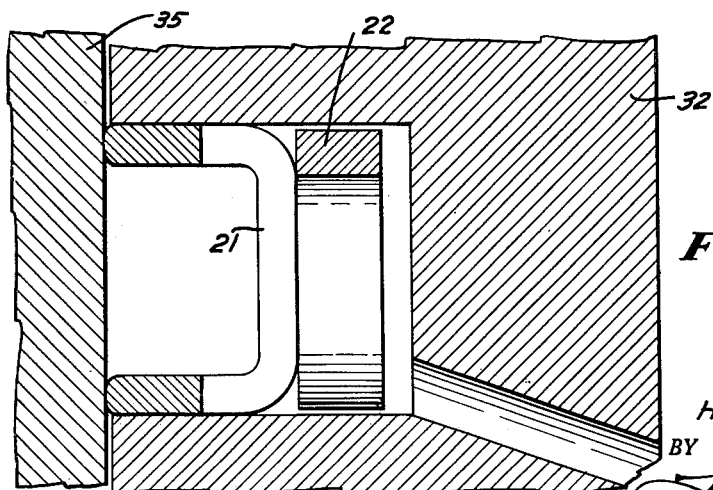
INVENTOR.
HELMUTH G. BRAENDEL
BY
*Leonard L. Kalish*
ATTORNEY.

United States Patent Office

2,771,329
Patented Nov. 20, 1956

2,771,329

COMPOSITE PISTON RING

Helmuth G. Braendel, Tredyffrin Township, Chester County, Pa., assignor to Wilkening Manufacturing Company, Philadelphia, Pa., a corporation of Delaware Application January 24, 1951, Serial No. 207,585

4 Claims. (Cl. 309—45)

The present invention relates to certain new and useful composite piston-rings for use in the ring-receiving grooves of pistons of internal combustion engines and the like, and it relates more particularly to 2-piece, 3-piece or multi-piece composite piston-rings including a non-bottoming circumferentially-compressible corrugated expander and one or more highly conformable cylinder-contacting elements having generally continuous or unbroken outer peripheries surrounding the expander and urged outwardly thereby against the cylinder-wall with equalized pressure throughout the circumferences thereof; the radial thickness of the expander being substantial and being more than half of the radial clearance between the inner peripheral surface of the cylinder-contacting element and the inner wall of the ring-receiving groove, and the free ends of the expander freely abutting each other when operatively disposed within the ring-receiving groove of a piston within a cylinder.

The object of the present invention is a piston-ring whose cylinder-contacting periphery or peripheries are generally continuous or unbroken (except at a single "gap") so as to provide a generally continuous contact with the cylinder surface and whose cylinder-contacting element or elements will have a high degree of flexibility or conformability so as to enable them to maintain full contact with the cylinder-wall throughout the peripheries, notwithstanding the deviations in the cylinder-wall from true circularity or from true cylindrical form such as are encountered in engines, and in which the contact-pressure per unit of contact-area (between cylinder-wall and cylinder-contacting element) is maintained relatively high, notwithstanding the inherent flexibility of and lack of tension in the cylinder-contacting elements, and in which said cylinder-contacting pressure is equalized or uniform throughout the periphery of the cylinder-contacting element and in which neither the unit-pressure nor its equalization around the periphery can be disturbed or affected by the lateral component of the connecting rod thrust or by any other deviation of the piston or of the inner wall of its ring-receiving groove.

Another object of the present invention is an oil-control piston-ring which will seat itself quickly in relation to the cylinder and which will conform to any out-of-roundness or other deformation of the cylinder, will be easy to install, and in which the possibility of faulty operation is minimized, if not indeed eliminated, and which will be highly effective and dependable in respect to its oil-control qualities, and which will be durable and not subject to fracture under the influence of heat and impact to which the ring is subjected in high-speed and high-compression internal combustion engines.

With the above and other objects in view, the present invention consists, in one aspect thereof, of a composite oil-control piston-ring comprising a circumferentially non-compressible U-cross-sectioned twin-contact cylinder-contacting element, the radial dimension of whose cross-section or whose "thickness" is relatively small and which is slotted at frequent intervals through the base of its U-cross-section by generally radial slots in whose planes the axis of the ring lies, and a circumferentially compressible axially and sinuously corrugated non-bottoming and end-abutting expander, the radial dimension of whose cross-section is greater than one-half of the radial clearance between the inner wall of the ring-receiving groove and the inner periphery of said cylinder-contacting element; the frequency, size and shape of the corrugations of the expander and the frequency, size and shape of said slots and of the intervening spring-lands being such that the expander cannot intermesh with or enter the slots and so that the expander will make frequent contact with the inner surfaces or spring-lands of the cylinder-contacting element intermediate said slots thereof.

In another aspect, the present invention consists of a generally annular and generally sinuously corrugated and circumferentially compressible pressure-equalizing expander, whose corrugations extend generally axially and the length of whose cycle (i. e. the circumferential distance between successive peaks on the same side of the expander) is approximately the same as its axial dimension, formed of a flat band of spring-steel or other spring-metal; the cross-section of said band being generally oblong rectangular, with the major dimension of said rectangle being in a generally radial direction and the minor dimension being in a generally circumferential direction, said expander having two juxtaposed and relatively wide flat ends disposed in a generally axial direction and being adapted to abut against each other and to maintain such abutment without any intervening connector or attachment when the expander, mounted in the ring-receiving groove, is compressed within the inner circumference of the cylinder-contacting element or elements of a composite spring-expanded piston-ring.

In another aspect, the present invention consists of a grooved and slotted oil-control ring-element of generally U-shaped cross-section formed of relatively hard tempered steel having a pair of relatively narrow and continuous cylinder-contacting surfaces, said cylinder-contacting surfaces being chromium-plated and said ring-element being relatively flexible in a radial direction and conformable to any slight out-of-roundness or other deformations of the cylinder wall.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the accompanying drawings, in which like reference numerals indicate like parts.

Figure 1 represents a perspective view of the composite oil-control piston-ring of the present invention, partly broken away and partly in cross-section, with fragmentary portions of the piston and cylinder shown surrounding the cross-sectioned portion of the piston-ring.

Figure 2 represents a plan view of a small piece of the flat sheet-metal of which the cylinder-contacting member of the composite piston-ring is formed; with the elongated holes or slots punched or otherwise formed through part of the strip, as it would appear in the process of making said member or in a partly completed condition.

Figure 3 represents a rear elevational view of a straight piece of the same strip of metal (fully punched with slots) after the marginal portions thereof have been bent to form the flanges of the ring-member; making a generally U-cross-sectioned strip slotted through the base of the U and partly through the legs of the U.

Figure 4 represents a perspective view of a portion of a helically coiled U-cross-sectioned and slotted strip shown in Figures 3 and 7, preparatory to being cut into single convolutions of cylinder-diameter or cylinder-periphery size.

Figure 9 represents a perspective view of the expander shown in Figures 7 and 8, but curved to approximately ring-radius or somewhat larger, and with its free ends shown in abutting contact with each other, in the manner in which they are disposed when in operative juxtaposition to the cylinder-contacting member when operatively mounted in the ring-receiving groove.

Figure 7:
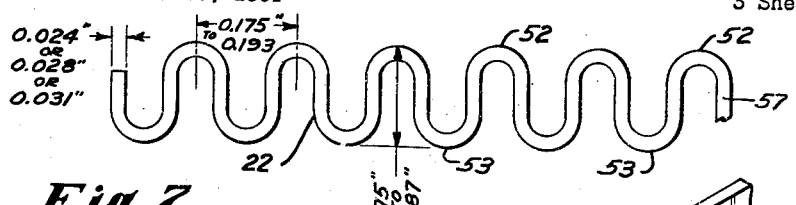
Figure 7 represents an elevational view of a fragmentary portion of the more or less sinuous pressure-equalizing expander, shown in flat condition, before it is formed into circular form.
Figure 5:
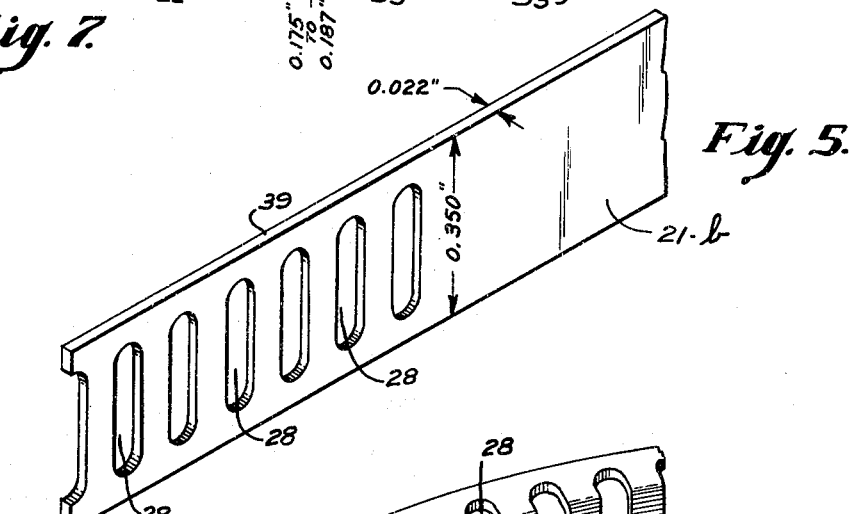
Figure 5 represents a perspective view of the strip shown in Figure 2.

Figure 9–a represents a view similar to that shown in Figure 9, but illustrating an alternative form of end-abutment.

Figure 10 represents a fragmentary enlarged rear-elevational view of the composite oil-control piston-ring, partly in cross-section. In order better to view the back of the slotted cylinder-contacting element, particularly along the bend-lines thereof, the expander has been reduced axially, slightly, in relation to the cylinder-contacting element. It is to be understood, however, that in actual practice this expander would have an axial dimension more nearly that of the cylinder-contacting element or member.

Figure 11 represents a cross-sectional view, similar to that shown in Figure 10, but showing a cylinder-contacting member whose cylinder-contacting edges are slightly rounded or curved.

The composite 2-piece oil-control piston-ring, representing one embodiment of the present invention, is composed of the cylinder-contacting ring designated generally by the numeral 21 and the expander 22.

For purposes of illustration only, I have applied some typical dimensions to the piston-ring shown in the accompanying drawings; these dimensions being approximately those for a nominally three-sixteenths inch (3/16") wide ring-receiving groove of a piston of an internal combustion engine. For ring-receiving grooves of other widths (and/or depths) the dimensions of the composite piston-ring will vary generally correspondingly.

The cylinder-contacting ring 21 is generally U-shaped in cross-section as shown in Figures 1, 4, 7 and 10, having side flanges 23 and 24 constituting the legs or sides of the U and the intervening web 25 constituting the base of the U; the flanges 23 and 24 meeting the intermediate web 25 through curved portions or fillets 26 and 27 as shown particularly in Figure 10.

Figure 6:
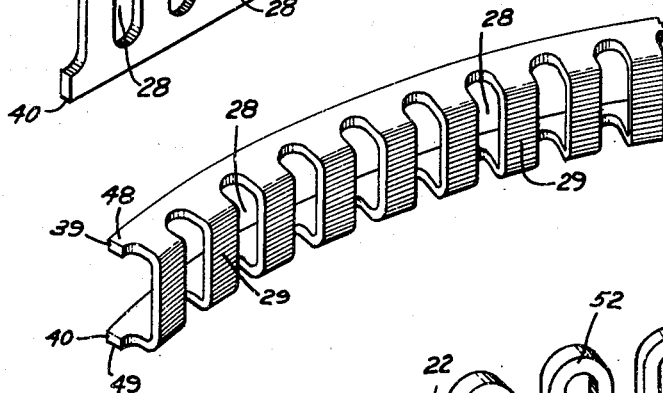
Figure 6 represents a perspective view, on the scale of Figure 3, of a fragmentary portion of the flanged and curved cylinder-contacting ring strip.

The web or back-wall 25 of the U-cross-sectioned ring 21, as well as the inner peripheral portions of the flanges 23 and 24 thereof, are interrupted by perforations or slots 28 which are formed, by a punching operation, in the blank sheet-metal or sheet-steel strip 21–b of which the ring-member 21 is formed; the perforations 28 being elongated and preferably having rounded ends as shown particularly in Figures 2 and 6. The apertures or slots 28 are preferably of such width and so spaced that the intervening webs 25 will be of substantially the same width as the widths of the apertures or slots 28.

The radial thickness of the cross-section of the ring-member 21 is preferably substantially less than its axial width, and preferably about two-thirds of such axial width or preferably less than three-quarters of such axial width; thereby to provide a substantial radial clearance between the inner diameter or inner spring-bearing surface 29 of the ring-member 21 and the inner wall or "bottom" 30 of the ring-receiving groove 31 of the piston 32 and also so as to increase the conformability of the ring. Within the radial clearance between the surfaces 29 and 30, the more or less sinuously corrugated split annular steel expander spring 22 is disposed, with its free ends 33 and 34 abutting each other as shown particularly in Figures 1, 9 and 9–a; the unrestrained or limp circumferential dimension of the expander spring 22 being sufficiently larger than the inner circumference of the spring-bearing surface 29 of the ring-element 21, when at cylinder-diameter, so that when the expander 22 is mounted in juxtaposition to the ring 21, within the ring-receiving groove 31 and with the ring-element 21 collapsed or confined to the diameter of the cylinder 35, the convolutions or corrugations of the spring 22 will be compressed sufficiently to cause the spring to bear against the inner diameter or surface 29 of the ring-element 21 with a uniformly distributed or equalized outward radial force; thereby to expand the generally limp (or untensioned) flexible and conformable ring-element 21 into conforming contact with the cylinder-wall 35.

The radial thickness of the expander 22 is substantially greater than one-half the radial clearance between the surfaces 29 and 30, and is at least approximately one-quarter (1/4) of the over-all radial thickness of the cylinder-contacting element 21, whereby the unconnected abutting ends 33 and 34 thereof are prevented from passing or overlapping each other and the loss of the spring-tensioning abutment thereof is prevented and the cylinder-contacting element 21 is conformed to the cylinder.

The radially-disposed dimension of the cross-section of the spring 22 is also substantially greater than its dimension at a right-angle to the radial dimensions, as indicated in Figure 10.

The cylinder-contacting ring-element 21 is formed of a flat strip of annealed steel of sufficient carbon content to permit it thereafter to be quench-hardened and drawn or tempered to desired hardness and resiliency. The annealed strip of sheet-metal 21–b is preferably of substantial length, in roll form, so that the successive operations up to and including the formation of the individual rings 21, may be performed in a more or less continuous manner.

By way of example only, in making the cylinder-contacting ring-elements 21 for a nominal 3/16" wide ring-receiving groove, the strip or band of sheet-metal may be twenty-two thousandths of an inch (0.022") in thickness and three-hundred-and-fifty thousandths of an inch (0.350") in width. The slots 28 each have an over-all length of two-hundred-and-forty thousandths of an inch (0.240") and a width of sixty-two thousandths of an inch (0.062") and have half-circular ends. The slots 28 are punched in succession; spaced apart from each other approximately sixty-two thousandths of an inch (0.062") so as to leave the intervening web portions 36 of approximately sixty-two thousandths of an inch (0.062") in width.

Thereafter, the slotted or punched strip 21–b is passed between a pair of forming rolls thereby bending the strip 21–b along two parallel lines or zones 37 and 38 which intersect the webs 36 intermediate their ends, to form the flanges 23 and 24.

The now U-cross-sectioned slotted strip is then rolled or coiled into the helical formation 43 of suitable diameter, as indicated in Figure 4, by passing it between two suitably spaced rollers and an additional roll or arbor. From this coil the individual convolutions are then cut by any suitable thin saw or abrasive cutting disc, to form the individual U-cross-sectioned ring-elements shown in Figure 1, with the gap 47 formed by this cutting operation.

The cylinder-contacting ring-elements 21, so formed, are then hardened and tempered to desired hardness and resiliency. If desired, the two outer side-surfaces 48 and 49 of the ring-element 21 may be ground more perfectly flat. The so-formed ring-elements 21 are then chromeplated, electrolitically, along their outer cylinder-contacting edges or faces 39 and 40 thereof.

The expander element 22 (of the same sized composite piston-ring) may be made of a flat band of spring-steel (or other spring-metal) having a thickness of twenty-four thousandths (0.024") or twenty-eight thousandths (0.028") or thirty-one thousandths (0.031") of an inch, and having a width of approximately fifty-thousandths of an inch (0.050") or wider; the distance between successive peaks 52 (or 53) being of the order of one-hundred-and-seventy-five thousandths of an inch (0.175") to one-hundred - and - ninety - three thousandths of an inch (0.193"), more or less, and with the axial width of the corrugated expander being of the order of one-hundred-and-seventy-five thousandths of an inch (0.175") to one-hundred - and - eighty - seven thousandths of an inch (0.187").

The narrow cylinder-contacting edges or surfaces 39 and 40 may be either fully cylindrical or may be slightly rounded in cross-section as indicated in Figure 11.

While the thickness of the band of which the expander is made may be substantially less than the slots 28, as indicated above, yet because of the generally sinuous formation of the expander and the curved or filleted juncture-zones 26 and 27 (Figure 10) intervening the flanges 23 and 24 and the base 25 of the U-cross-section of the ring-element 21, the expander will not nest in or interlock with the slots 28, but the successive flat spring-receiving surfaces or spring-lands 29 of the webs 38 of the ring-element 21 will receive the outward radial thrust of the circumferentially compressed non-bottoming expander 22; the expander 22 being securely confined within the innermost periphery of the ring-element 21 defined by the spring-lands thereof; the spring-lands 29 being at the innermost periphery of the ring-element 21.

The radial width of the expander 22 is substantially less than the clearance 54 between the spring-lands 29 of the ring-element 21 and the inner wall 30 of the ring-receiving groove, as indicated in Figure 10.

When the elongated flat ends 33 and 34 of the expander 22 are then abutted in the manner indicated in Figure 9 or in the manner indicated in Figure 9-a, the abutment cannot be disturbed or lost after the composite piston-ring is operatively installed in the ring-receiving groove.

By reason of the frequency of the slots 28 and their entry into the flanges 23 and 24 to a substantial extent, as indicated in Figure 10, the flanges 23 and 24 become very flexible or conformable in a radial direction, so that the expander 22, bearing against the spring-lands 29 of the ring-element 21 at frequent and closely spaced intervals, will not only expand the ring-element 21 with a uniformly disturbed and equalized outward radial force of any desired magnitude (by varying the thickness of the metal of the expander and its circumferential length from end to end, for any given inner diameter of the ring-element 21), but the ring-element 21 will be conformed to any out-of-roundness or other irregularities or distortions encountered in engines.

Figure 8:
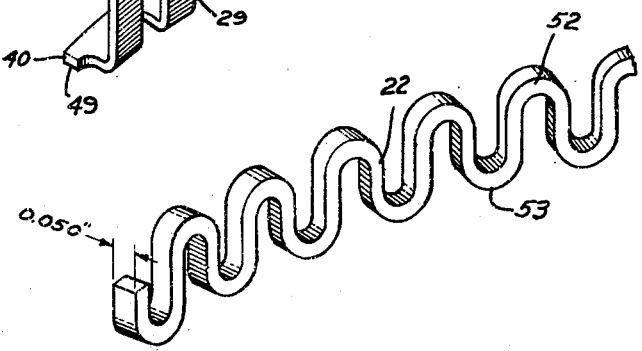
Figure 8 represents a fragmentary perspective view of the expander shown in Figure 7.

The corrugations of the expander 22 are preferably so arranged that the successive legs 57 thereof, intermediate the curved crests or peaks 52 and 53 thereof, are generally axially disposed and generally parallel as indicated in Figures 7, 8 and 9. The crests or peaks 52 are all of the same height and the crests or peaks 53 are also all of the same height.

All the slots 28 (rather than only certain of them) being centrally spaced or equidistantly disposed between the two cylinder-contacting edges 39 and 40, the flexibility and conformability of the ring-element 21 are more uniform throughout its circumference.

By reason of the "cycle" of the corrugated expander being approximately of the order of the axial width of the expander and the general parallelism or axial disposition of the legs intervening the curved crests of the corrugations, a relatively lower spring-rate is provided for any given cross-section of the metal strip of which the expander is formed, so that the contact-pressure between the cylinder-contacting surfaces 39 and 40 and the cylinder will not be appreciably altered by slight variations in cylinder-diameter or by any slight variations in the radial flexibility or in the radial thickness of the cylinder-contacting element. The stressing of the expander is also reduced.

The composite piston-ring of the present invention effectively overcomes the disadvantages of the spring-tensioned composite piston-rings of the prior art.

Thus, for instance, the spring-expanded piston-rings of the type in which the cylinder-contacting surface or surfaces of the piston-ring are discontinuous or interrupted at frequent intervals and in which a multiplicity of expanding-springs are integral with and intervene the short arcuate and discontinuous cylinder-contacting elements (or so-called "segments") of the piston-ring, while having a desirable high comformability to cylinder-wall and while having the desirable feature of having the outer radial pressure generally uniformly distributed throughout the circumference, have the countervailing disadvantage of having many small gaps in the cylinder-contacting surface, through which gases of combustion under pressure, as well as the oil, may pass the piston-ring when at high compression or at certain engine speeds. Piston-rings of this type also have the disadvantage of being relatively fragile and costly, and lack dependability over prolonged periods of use under all the operating conditions encountered in engine practice. Piston-rings of this type are exemplified by the following patents: 2,044,272; 2,044,273; 2,044,274; 2,224,338; 2,267,369; 2,277,307; 2,290,321; 2,293,681; 2,293,682; 2,293,699; 2,296,463; 2,333,457; 2,345,589; 2,346,204; 2,346,896; 2,389,141; 2,397,636; 2,421,175 and 2,432,602.

On the other hand, however, piston-rings having continuous peripheries with a single "bottoming" expander-spring behind the piston-ring which is radially corrugated or which has its spring elements disposed in a generally radial direction with its innermost portions bearing against the inner wall of the ring-receiving groove, have the disadvantage of contacting the ring-element at comparatively few points, so that the outward radial pressure is spotty and not uniformly distributed, and have the further disadvantage of not permitting the maintenance of a predetermined unit pressure against the ring-element, because the radial force exerted by such expander varies with any variation in the radial depth of the groove and also varies with any lateral motion of the piston, as, for instance, occasioned by the lateral component of the thrust of the connecting-rod. This type of spring-expanded piston-ring construction, exemplified by Patents 1,911,736; 1,966,782; 2,085,457; 2,175,409; 2,183,199 and 2,281,873 (among many others), also has the disadvantage that the wear at the comparatively few contact points at which the expander contacts the inner wall of the spring-receiving groove tends quickly to affect the unit pressure and the general efficacy of the piston-ring.

To overcome this disadvantage, many attempts have been made to make the expanding force and the entire operation of the piston-ring independent of the groove-depth and lateral piston-play. Thus, for instance, in Patents 1,767,711, 2,452,503 and 2,293,450 the expander was made "non-bottoming." However, the coiled expanders of Patents 1,767,711 and 2,452,503 have been found to be ineffective because the deflection of the metal of the coil is torsional in character (as distinguished from the bending deflection in the expander of my present invention), so that the expander can "bunch" in spots and thus give a high expanding pressure per unit of cylinder-contacting area at one part of the circumference of the ring while giving a relatively low pressure per unit of area at other parts of the same circumference. Moreover, friction between the coiled expanders of Patents 1,767,711 and 2,452,503 and the cylinder-contacting elements of these patents, has been found to be so great that such friction also contributes to creating substantial inequalities in the circumferential distribution of the expanding force of the expander. These inequalities are further influenced by the considerable "nesting" between coil-spring and cylinder-contacting element, as in the case of the structures of Patents 1,767,711 and 2,452,503, and also as in 2,439,702 and 2,445,090.

Piston-rings with non-bottoming expanders of the type shown in Figure 6 of Patent 1,767,711 and of the type shown in Patent 2,293,450, have the disadvantage of requiring a connection or securement between the abutting ends of the expander and such securement or connection is not only hazardous, costly and difficult to achieve but tends to become undependable in actual operation. Moreover, the "cycle" of the corrugations being substantially greater than the transverse dimension of the expander (in the direction of such corrugations), the corrugations lack the kind of elasticity or deflection necessary for a freely equalized distribution of radial thrust and lack the kind of elasticity or deflection requisite for the maintenance of the same expanding force over a long operating life-span of the piston-ring.

While the interconnection of the ends of the non-bottoming expander of Patent 2,452,503 and the coiled-spring expanders of Patent 1,767,711, is not fragile in the sense of a tendency to break under operating conditions, such interconnection is nevertheless disadvantageous because any turning of the ends of the spring in relation to each other, creating (as it does) greater or lesser engagement or overlap between the ends, seriously affects the cylinder-contacting pressure, because it changes the effective circumferential dimension of the expander.

By the composite piston-ring construction of my present invention, a highly flexible and conformable cylinder-contacting element or elements may be used without any break in the continuity of the cylinder-contacting surfaces (except at a single "gap"), yet with complete assurance of the predetermined and permanently maintainable unit of cylinder-contacting pressure per unit of cylinder-contacting area, of any magnitude desired for the particular piston-ring, and with complete assurance that such pressure will be equalized or uniformly distributed throughout the circumference and such equalization or uniformity of distribution will be permanently maintained, and also with complete assurance that the expander element cannot fail because of loss of the abutment of its unconnected ends or because of any nesting or excessive friction with the cylinder-contacting element.

Having thus shown and described the invention, I claim the following:

1. A composite multi-piece piston-ring for use in and with the cylinder and piston of internal combustion engines and the like, said composite multi-piece piston-ring comprising a pair of flat spaced-apart parallel conformable and circumferentially non-compressible metal cylinder-contacting ring-elements the combined axial thickness of the cylinder-contacting faces of which is substantially less than the axial width of said composite piston-ring and whose outer side-surfaces constitute the outer side-surfaces of said piston-ring, said ring-elements having continuous cylinder-contacting surfaces except for a single interruption of each, means spacing apart said flat cylinder-contacting ring-elements in relation to each other, a generally annular circumferentially compressible axially corrugated resilient non-bottoming expander interrupted at one point and formed of a flat band of spring-steel of oblong cross-section whose major dimension is disposed radially of said piston-ring and whose minor dimension is disposed at a right angle to its major dimension, said expander having axially disposed abuttable tabs which are in free abutted and unconnected relationship to each other when said composite piston-ring is installed in the ring-receiving groove of a piston in a cylinder, and the radial width of said expander being substantially greater than one-half the radial clearance between the inner axially disposed wall of the ring-receiving groove of said piston and the effective inner peripheries of said cylinder-contacting ring-elements, and the length of the cycle of said corrugations being approximately of the order of the axial width of said expander and said corrugations having curved crests of generally uniform height and lying in the same general cylindrical formation in which the expander as a whole lies.

2. A composite multi-piece piston-ring for use in and with the cylinder and piston of internal combustion engines and the like, said composite multi-piece piston-ring comprising a pair of thin flat split annular sheet-steel sealing rings adapted to contact and to seal against the cylinder-wall of the engine, said sealing rings forming the two outer sides of such composite multi-piece piston-ring, spacing means intermediate said pair of sealing rings and spacing them apart and in parallel relation to each other, said spacing means having passages therethrough through which oil may pass, and the outer cylinder-contacting edges of said sealing rings being generally continuous and uninterrupted except at the one point in each such ring where the ring is split, and a circumferentially compressible non-bottoming resilient expander disposed radially inwardly of said pair of sealing rings and radially inwardly of said spacing means, said expander comprising a split, annular, axially corrugated band of spring-steel of oblong and generally rectangular cross-section, the major dimension of which cross-section is disposed radially of the expander and the minor dimension of which is disposed at a right angle to its major dimension, in which each of the crests of the corrugations is single curve and in which the length of the cycle of said corrugations is approximately of the order of the axial dimension of the expander, and in which said corrugations have generally parallel and axially disposed portions intermediate its curved crests and in which the heights of said crests are generally uniform, and the radial width of said expander being substantially greater than one-half the radial clearance between the innermost diameter of the sealing-ring portions of said composite multi-piece piston-ring and the inner wall of the ring-receiving groove, and said split annular corrugated expander having relatively wide, elongated, flat unconnected surface tabs at its ends extending generally axially and adapted to freely abut each other when said composite multi-piece piston-ring is operatively mounted in a ring-receiving groove of the piston in the cylinder and to maintain their abutting relationship without any additional or separate aligning means to aid in keeping said tabs in abutting alignment with each other, and the axial dimension of said corrugated expander being greater than the distance between the inner side-surfaces of said sealing rings and less than the distance between the outer side-surfaces thereof, said expander being adapted to be circumferentially compressed and to exert an outward radial force operative upon said sealing rings when said composite multi-piece piston-ring is operatively mounted in the ring-receiving groove of the piston in the cylinder, and said sealing rings being sufficiently flexible in a radial direction to be generally conformable to the cylinder when urged outwardly against the cylinder by said expander.

3. A circumferentially compressible non-bottoming resilient expander for and to form a part of a composite and conformable composite piston-ring for use with and in a piston and cylinder having a circumferential non-compressible annular cylinder-contacting sealing element with generally continuous and uninterrupted cylinder-contacting surface, said expander comprising a split annular axially corrugated band of spring-steel formed by bending a relatively flat band of spring-steel back and forth upon itself across its major cross-sectional dimension, said band of spring-steel being of oblong rectangular cross-section, the major dimension of which cross-section is disposed radially of the axis of the expander and whose minor dimension is disposed at a right angle to its major dimension, in which expander each of the crests of the corrugations is single curve and in which the length of the cycle of said corrugations is approximately of the order of the axial dimension of the expander, and in which the heights of said crests are generally uniform, and the ends of said split annular expander being relatively wide elongated flat unconnected abuttable tabs extending generally axially and adapted to abut each other when the expander is operatively mounted within and as a part of the aforementioned composite piston-ring in the piston and cylinder, without the aid of any added means to keep the abutting ends of said expander in abutting alignment with each other.

4. A circumferentially compressible non-bottoming resilient expander for and to form a part of a composite and conformable composite piston-ring for use with and in a piston and cylinder having a circumferential non-compressible annular cylinder-contacting sealing element with generally continuous and uninterrupted cylinder-contacting surface, said expander comprising a split annular axially corrugated band of spring-steel formed by bending a relatively flat band of spring-steel back and forth upon itself across its major cross-sectional dimension, said band of spring-steel being of oblong rectangular cross-section, the major dimension of which cross-section is disposed radially of the axis of the expander and whose minor dimension is disposed at a right angle to its major dimension, in which expander each of the crests of the corrugations is single curve and in which the length of the cycle of said corrugations is approximately of the order of the axial dimension of the expander, and in which said corrugations have generally parallel and axially disposed portions intermediate its curved crests and in which the heights of said crests are generally uniform, and the ends of said split annular expander being relatively wide elongated flat unconnected abuttable tabs extending generally axially and adapted to abut each other when the expander is operatively mounted within and as a part of the aforementioned composite piston-ring in the piston and cylinder, without the aid of any added means to keep the abutting ends of said expander in abutting alignment with each other.

References Cited in the file of this patent

UNITED STATES PATENTS

| | | |
|---|---|---|
| 657,548 | Kelsey | Sept. 11, 1900 |
| 1,359,596 | Hill | Nov. 23, 1920 |
| 1,422,780 | Phelps et al. | July 11, 1922 |
| 2,229,578 | Malpas | Jan. 21, 1941 |
| 2,235,297 | Norton et al. | Mar. 18, 1941 |
| 2,293,450 | Wilkening | Aug. 18, 1942 |
| 2,468,980 | Huber | May 3, 1949 |
| 2,511,874 | Phillips | June 20, 1950 |
| 2,564,744 | Wilkening | Aug. 21, 1951 |
| 2,639,205 | Wilkening et al. | May 19, 1953 |

FOREIGN PATENTS

| | | |
|---|---|---|
| 520,351 | Great Britain | Apr. 22, 1940 |
| 560,783 | Great Britain | Apr. 20, 1944 |